United States Patent [19]

Asayama

[11] Patent Number: 4,872,437
[45] Date of Patent: Oct. 10, 1989

[54] FUEL PRESSURE REGULATOR FOR INTERNAL COMBUSTION ENGINE

[75] Inventor: Yoshiaki Asayama, Hyogo, Japan

[73] Assignee: Mitsubishi Denki Kabushiki Kaisha, Tokyo, Japan

[21] Appl. No.: 212,622

[22] Filed: Jun. 28, 1988

[30] Foreign Application Priority Data

Jun. 29, 1987 [JP] Japan .................. 62-161667

[51] Int. Cl.⁴ ........................... F02M 39/00
[52] U.S. Cl. ..................... 123/463; 123/382
[58] Field of Search .......... 123/463, 457, 464, 465, 123/382, 383

[56] References Cited

U.S. PATENT DOCUMENTS

| | | | |
|---|---|---|---|
| 3,722,487 | 3/1973 | Ohuma | 123/382 |
| 4,184,465 | 1/1980 | Nakazeki | 123/463 |
| 4,228,227 | 10/1980 | Haase | 123/463 |
| 4,481,926 | 11/1984 | Miki | 123/463 |

FOREIGN PATENT DOCUMENTS

| | | | |
|---|---|---|---|
| 113297 | 6/1941 | Australia | 123/463 |
| 0071726 | 6/1978 | Japan | 123/463 |
| 0132458 | 10/1981 | Japan | 123/463 |

Primary Examiner—Carl Stuart Miller
Attorney, Agent, or Firm—Sughrue, Mion, Zinn, Macpeak and Seas

[57] ABSTRACT

A fuel pressure regulator includes a valve member 18 supported by a diaphram 16 which serves to receive fuel pressure supplied by a fuel pump, first and second cylindrical valve seats 15a, 22 associated with the valve member to perform on-off operations, and a spring 30 for moving the second valve seat together with the diaphram according to an engine operating condition to vary fuel pressure.

2 Claims, 2 Drawing Sheets

FUEL PRESSURE REGULATOR FOR INTERNAL COMBUSTION ENGINE

BACKGROUND OF THE INVENTION

The present invention relates to a fuel pressure regulator for use in an electronically controlled fuel injection device of an internal combustion engine and, particularly, to such a regulator capable of varying the pressure of fuel supplied to a fuel injection valve arbitrarily according to an operating condition of the engine.

A conventional fuel pressure regulator used in a fuel injection device of an internal combustion engine mounted on an automobile, etc. includes a valve member supported by a diaphram serving as a pressure receiving plane for fuel supplied under pressure by a pump, a valve seat associated therewith, a first chamber defined by the diaphram and mounting the valve member and the valve seat, and a spring having a predetermined mounting load mounted in a second chamber defined by the diaphram for biasing the valve member toward the valve seat. The second chamber is communicated to atmosphere or to a suction tube, so that, when the fuel pressure exceeds a preset value, the valve member is separated from the valve seat against the spring force and, otherwise, the valve member is urged to the valve seat to close a passage, resulting in a constant fuel pressure in the first chamber. The preset value is usually regulated to 2 to 3 $Kg/cm^2$. Therefore, the mounting load of the spring is not less than 10 Kg since it is a product of the fuel pressure and the pressure receiving area of the diaphram.

Therefore, in order to vary the preset pressure value according to the operating condition of engine, it is necessary to change the mounting load of the spring, which is as large as 10 Kg, as proposed in, for example, Japanese Kokai No. 132068/1985. An electromagnetic device capable of directly performing such change is very large in size and so it is practically very difficult to employ such a proposition for a vehicle mounted device.

SUMMARY OF THE INVENTION

An object of the present invention is to provide a fuel pressure regulator capable of easily changing fuel pressure.

According to the present invention, the above object can be achieved by a fuel pressure regulator comprising a valve member supported by a diaphram providing a pressure receiving plane, a first cylindrical valve seat associated with the valve member to perform an on-off operation, a second valve seat slidably supported by an inner peripheral surface of the first valve seat and means for moving the second valve seat according to an operating condition of internal combustion engine.

The fuel pressure regulator according to the present invention regulates a first fuel pressure by a relative movement of the valve member to the first valve seat and a second fuel pressure by a relative movement of the valve member to the second valve seat.

DETAILED DESCRIPTION OF THE PREFERRED EMBODIMENT

Figure 1:
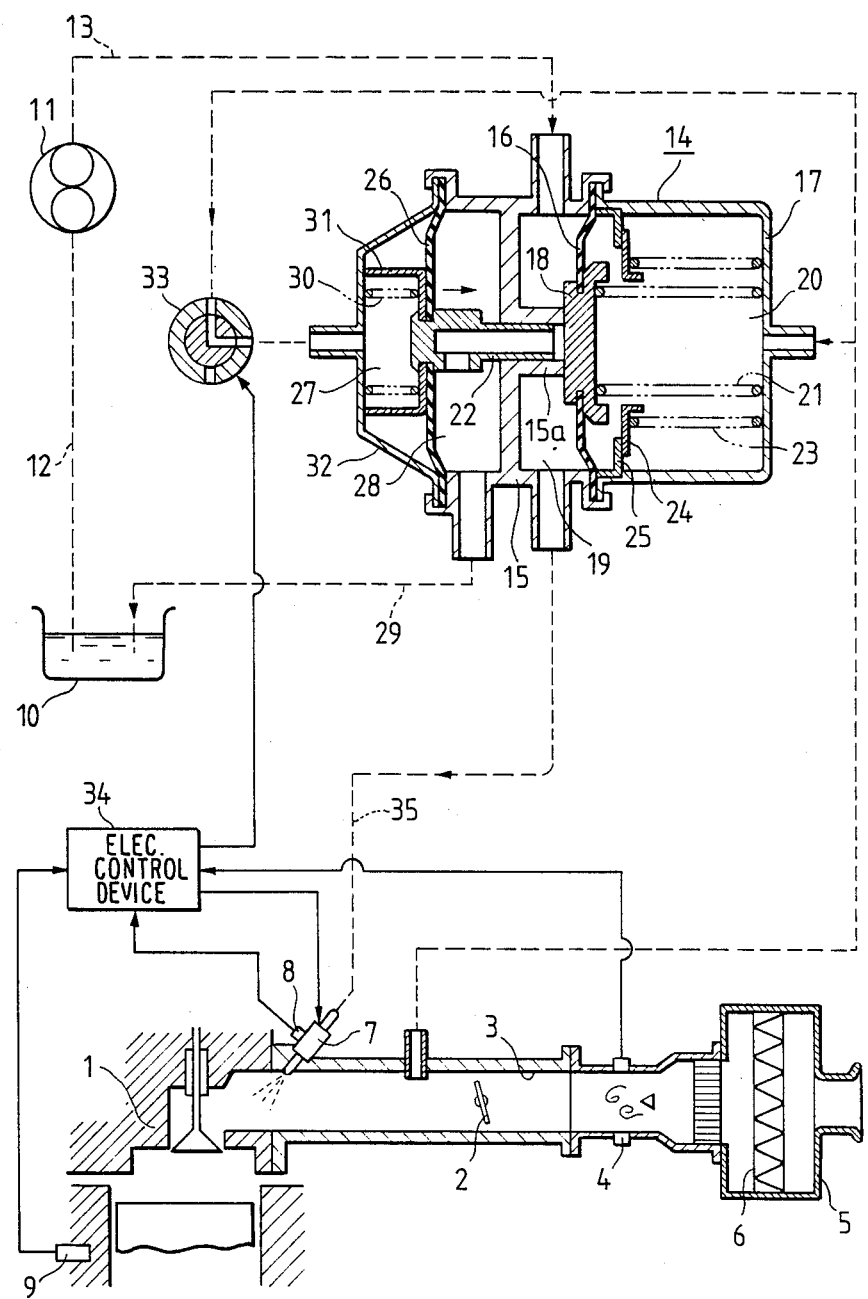
FIG. 1 is a cross section of an embodiment of the present invention.

In FIG. 1 which shows an embodiment of the present invention in cross section, reference numeral 1 depicts an internal combustion engine, 2 is a throttle valve ganged with an acceleration pedal of an automobile, 3 is a suction tube, 4 is an air flow sensor for detecting the amount of air introduced into the engine 5 is an air cleaner, 6 is a filter element housed in the air cleaner and 7 is a fuel injection valve for injecting fuel supplied under pressure to the engine in synchronism with the engine rotation. Reference numeral 8 depicts a temperature sensor for detecting the temperature of the fuel injection valve 9 is a revolution detector for detecting the engine revolution, 10 is a fuel tank, 11 is a fuel pump coupled through a pipe 12 to the fuel tank 13 is a pipe connected to the discharge side of the fuel pump, and 14 is a fuel pressure regulator.

The fuel pressure regulator 14 includes a housing having a cylinder portion 15. A partition wall is formed in the cylinder portion, which is formed with a center hole and with a first cylindrical valve seat 15a protruding axially from a periphery of the center hole. A first diaphram 16 receives fuel supplied under pressure from the fuel pump 11 and is supported by the cylinder portion 15 and a cover 17 pressure-fitted to an opening of the cylinder portion 15. A valve member 18 is supported by the diaphram 16 in such a way that it can be axially moved together with the diaphram.

A first chamber 19 defined in the cylinder portion 15 by the first diaphram 16 at one side thereof is communicated with the fuel pump 11 through the pipe 13 and forms a fuel pressure regulation chamber. A second chamber 20 defined in the cylinder portion 15 by the first diaphram 16 at the other side thereof, i.e., on the side of the cover 17, is communicated to the suction tube 3. A first spring 21 is provided in the second chamber 20 for biasing the valve member 18 against the first valve seat 15a. A second spring 23 is disposed outside the first spring 21 in the second chamber 20 and held between a bottom of the cover 17 and a spring receiver 24 in a compressed state with a predetermined load. The spring receiver 24 abuts a spring stopper 25 fitted in an inner periphery of the cover 17 so that the second spring 23 is held compressed. The first valve seat 15a slidably supports a cylindrical second valve seat 22 for axial movement in the direction of the first diaphram 16. A second diaphram 26 is disposed such that it closes the other opening of the cylinder portion 15 and moves the second valve seat 22 according to the pressure of an air chamber 27 disposed opposite an overflow chamber 28 to be described. The second diaphram 26 supports one end of the second valve seat 22 such that an outlet of the second valve seat 22 is positioned in the overflow chamber 28. The overflow chamber 28 defined in the cylinder portion 15 by the second diaphram 26 is communicated with the fuel tank 10 through an overflow pipe 29.

Reference numeral 30 depicts an air chamber spring for biasing the second diaphram 26 in a direction shown by an arrow, 31 is a stopper for limiting the movement of the second diaphram 26 in the opposite direction to the arrow, and 32 is an air chamber cover for supporting, together with the other opening of the cylinder portion 15, the second diaphram 26 to form the above mentioned air chamber 27.

An electromagetic switch valve 33 is provided for introducing the pressure of the suction tube 3 or atomospheric pressure into the air chamber 27. An electronic control device 34 is also provided which is responsive to output signals from the air flow sensor 4, the revolution detector 9 and the temperature sensor 8 to drive and control the fuel injection valve 7 and the electromagnetic switch valve 33. Reference numeral 35 depicts a pipe for supplying fuel whose pressure is regulated in the first chamber 19 to the fuel injection valve 7.

In operation, when the engine 1 is started, air flows through the air cleaner 5 and, after the amount thereof is detected by the air flow sensor 4, is introduced into the engine 1 through the suction pipe 3. On the other hand, fuel in the fuel tank 10 is supplied under pressure to the first chamber 19 by the pump 11. When the engine 1 is started, the pressure of the air chamber 27 communicated with the suction tube 3 is lowered. Therefore, the second diaphram 26 is moved together with the second valve seat 22 against the air chamber spring 30 in the opposite direction to the arrow and thus the valve member 18 is urged to the first valve seat 15a by the first spring 21 as shown in FIG. 1. When the fuel pressure in the first chamber 19 exceeds a predetermined value, the diaphram 16 moves against the force of the first spring 21 and so the valve member 18 is separated from the first valve seat 15a, so that high pressure fuel is allowed to flow through a hollow portion of the second valve seat 22, the overflow chamber 28 and the overflow pipe 29 to the fuel tank 10 to lower the pressure of the first chamber 19. Upon the lowering of the pressure in the first chamber 19, the valve member 18 contacts the first valve seat 15a again to stop the overflow. Thus, fuel pressure in the first camber 19 is maintained at a first preset valve determined by the first spring 21. Pressure-regulated fuel is supplied through the pipe 3 to the fuel injection valve 7 and injected thereby. In order to maintain the fuel the pressure at the preset value by using pressure in the suction tube 3 as a reference, the reference pressure is introduced into the second chamber 20 and received by the first diaphram 16.

Figure 2:
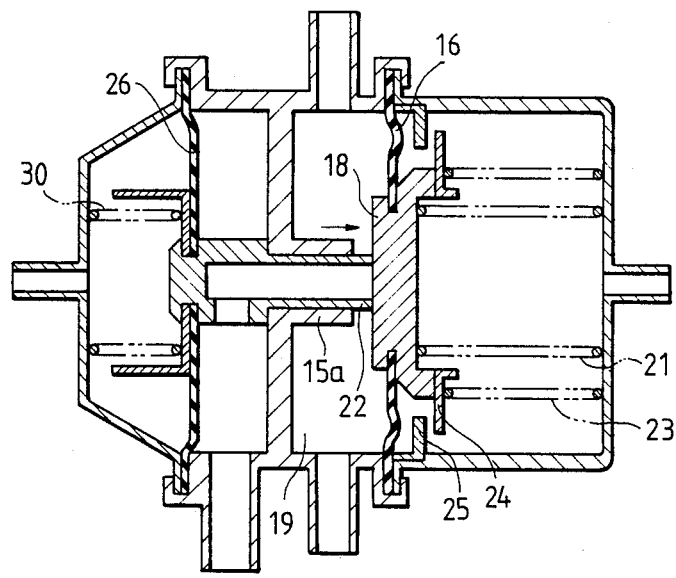
FIG. 2 is a cross section of a main portion of the embodiment in FIG. 1, showing the operation of a second spring thereof.

The fuel injection valve 7 is driven and injects fuel for a predetermined time period in synchronism with the engine rotation by the electronic control device 34. In the case where the engine is to be started while it is still hot, a vapor-lock phenomenon may occur due to the high temperature of the fuel in the fuel injection valve 7, as pointed out in Japanese Kokai No. 132068/1985. In the present invention, when the fuel temperature in the fuel injection valve 7 exceeds a redetermined value, it is detected by the temperature sensor 8 and informed to the electronic control device 34 which drives the electromagnetic switch valve 33 to switch the pressure in the air chamber 27 to atmospheric pressure. As a result, the second diaphram 26 is moved by the air chamber spring 30 in the arrow direction together with the second valve seat 22. Since the valve member 18 is kept in contact with the second valve seat 22 while the latter moves, the fuel pressure in the first chamber 19 increases upon which the diaphram 16 moves in the arrow direction shown in FIG. 2. Therefore, the second valve seat 22 can be moved by a very small force to the state shown in FIG. 2. Therefore, the valve member 18 remains in contact with the second valve seat 22 and is on-off controlled in this position. However, in this case, the spring receiver 24 comes into contact with the valve member 18 and is separated from the spring stopper 25, upon which the second spring 23 acts on the valve member 18 which increases the fuel pressure by an amount corresponding to the spring force of the second spring 23. That is, the fuel pressure in the first chamber 19 is maintained at a second preset value determined by the first and the second springs 21 and 23. Since, therefore, the fuel pressure injected by the fuel injection valve 7 is increased, any vapor-lock phenomenon is prevented.

When the engine 1 is stopped and the operation of the fuel pump 11 is stopped, the pressure acting on the first chamber 19 is removed. Therefore, the valve member 18 is moved by the first spring 21 in the opposite direction to the arrow and urged against the first valve seat 15a to prevent the fuel in the first chamber 19 from flowing to the overflow chamber 28 to thereby maintain the fuel pressure in the first chamber 19 at the preset value. As a result, a time lag of the fuel supply when restarting of the engine is prevented.

It should be noted that, although the second valve seat 22 is made to contact the valve member 18 by the air chamber spring 30 which has a relatively small force, when the engine 1 is stopped, the first valve seat 15a can not be separated from the valve member 18 because the first spring 21 has a spring force larger than that of the spring 30, and thus fuel can not leak through a gap between the first valve seat 15a and the second valve seat 22.

Although, in the described embodiment, the second valve seat 22 is moved by a pressure acting on the second diaphram 26, it may be possible to move it by means of an electromagnet or electric motor

What is claimed is:

1. A fuel pressure regulator (14) for an internal combustion engine for regulating fuel pressure to be supplied to a fuel injection valve (7), comprising: a rigid valve closure member (18) supported by a flexible diaphragm (16) providing a pressure sensitive surface for fuel supplied by a fuel pump (II), a first cylindrical valve seat (15a) cooperable with said valve closure member for on-off controlling a fuel recirculating passage (29) to a fuel tank (10), a second cylindrical valve seat (22) slidably supported by and coaxially disposed within said first cylindrical valve seat, said second cylindrical valve seat being similarly cooperable with said valve closure member, and means (30, 33) for moving said second valve seat in a first direction towards said diaphragm in accordance with a sensed operating condition of said engine.

2. The fuel pressure regulator as claimed in claim 1, further comprising a cover member (17) for supporting said diaphragm and forming an air chamber (20), first spring means (21) provided between a bottom of said cover member and said valve closure member, and second spring means (23) having one end supported by said bottom of said cover member for biasing said valve closure member in a second direction opposite said first direction when said valve closure member engages the other end of said second spring means.

* * * * *